US010762775B2

(12) United States Patent
Youm et al.

(10) Patent No.: US 10,762,775 B2
(45) Date of Patent: Sep. 1, 2020

(54) VEHICLE TERMINAL DEVICE AND CONTROL METHOD THEREOF

(71) Applicant: Samsung Electronics Co., Ltd., Suwon-si, Gyeonggi-do (KR)

(72) Inventors: Sun-hee Youm, Suwon-si (KR); Un-kyu Park, Seoul (KR); Beom-seok Oh, Incheon (KR); Jin-wook Lee, Yongin-si (KR); Su-min Hong, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/865,767

(22) Filed: Jan. 9, 2018

(65) Prior Publication Data
US 2018/0197409 A1    Jul. 12, 2018

(30) Foreign Application Priority Data
Jan. 10, 2017 (KR) .................. 10-2017-0003373

(51) Int. Cl.
G08G 1/01 (2006.01)
G08G 1/00 (2006.01)
(Continued)

(52) U.S. Cl.
CPC ....... G08G 1/0112 (2013.01); G06K 9/00845 (2013.01); G07C 5/085 (2013.01);
(Continued)

(58) Field of Classification Search
CPC ....... H04W 4/44; G07C 5/008; G08G 1/0133; G08G 1/205
See application file for complete search history.

(56) References Cited

U.S. PATENT DOCUMENTS 5,969,598 A * 10/1999 Kimura .................. B60R 21/01
                                                        180/274
8,682,285 B2    3/2014 Stahlin et al.
(Continued)

FOREIGN PATENT DOCUMENTS

CN            102785631 A      11/2012
DE     10 2009 015 513 A1     10/2009
(Continued)

OTHER PUBLICATIONS

International Search Report dated Mar. 22, 2018, issued in International Application No. PCT/KR2018/000446.
(Continued)

Primary Examiner — Hongmin Fan
(74) Attorney, Agent, or Firm — Jefferson IP Law, LLP

(57) ABSTRACT

A vehicle terminal device is provided. The vehicle terminal device includes a first communicator configured to communicate with an apparatus included in the vehicle using a first wireless communication, a second communicator configured to communicate with an apparatus outside the vehicle using a second wireless communication, a detector configured to detect state information of the vehicle, and a controller configured to control the second communicator to broadcast an accident alert message for alerting of an accident involving the vehicle to at least one of an apparatus included in an adjacent vehicle or a traffic management device in response to a determination of the accident based on the state information of the vehicle detected through the detector, and control the second communicator to transmit at least one of information received from the apparatus included in the vehicle through the first communicator or the state information of the vehicle detected through the detector, to an external server.

16 Claims, 8 Drawing Sheets

(51) Int. Cl.
*G06K 9/00* (2006.01)
*H04W 4/44* (2018.01)
*G08B 25/00* (2006.01)
*G08B 25/10* (2006.01)
*G08B 25/08* (2006.01)
*G08B 25/01* (2006.01)
*G07C 5/08* (2006.01)
*G07C 5/00* (2006.01)

(52) U.S. Cl.
CPC ............ G08B 25/00 (2013.01); G08B 25/016 (2013.01); G08B 25/08 (2013.01); G08B 25/10 (2013.01); G08G 1/0133 (2013.01); G08G 1/205 (2013.01); H04W 4/44 (2018.02); *G07C 5/008* (2013.01)

(56) References Cited

U.S. PATENT DOCUMENTS

| | | | |
|---|---|---|---|
| 9,842,496 B1* | 12/2017 | Hayward | G08G 1/166 |
| 2009/0015684 A1 | 1/2009 | Ooga et al. | |
| 2010/0030540 A1 | 2/2010 | Choi et al. | |
| 2011/0177791 A1 | 7/2011 | Stahlin et al. | |
| 2012/0158249 A1* | 6/2012 | Xu | B60R 21/0132 701/45 |
| 2013/0267194 A1* | 10/2013 | Breed | H04W 4/90 455/404.2 |
| 2015/0342542 A1 | 12/2015 | An et al. | |
| 2016/0063773 A1* | 3/2016 | Hatton | G07C 5/085 701/29.1 |
| 2016/0086491 A1 | 3/2016 | Choi | |
| 2016/0094964 A1 | 3/2016 | Barfield, Jr. et al. | |
| 2016/0275790 A1* | 9/2016 | Kang | G06K 9/00791 |
| 2017/0101054 A1* | 4/2017 | Dusane | G08G 1/127 |
| 2017/0124788 A1* | 5/2017 | Nishida | G07C 5/0866 |
| 2017/0171733 A1* | 6/2017 | Jung | G06K 9/00791 |
| 2018/0137698 A1* | 5/2018 | Yasuda | B60R 21/00 |

FOREIGN PATENT DOCUMENTS

| | | |
|---|---|---|
| EP | 2 953 106 A1 | 12/2015 |
| JP | 2009-258878 A | 11/2009 |
| KR | 10-2007-0040043 A | 4/2007 |
| KR | 10-2009-0070812 A | 7/2009 |
| KR | 10-2010-0015166 A | 2/2010 |
| KR | 10-2014-0091945 A | 7/2014 |
| KR | 10-2014-0110524 A | 9/2014 |
| KR | 10-1499508 B1 | 3/2015 |
| KR | 10-1562591 B1 | 10/2015 |
| KR | 10-2016-0035466 A | 3/2016 |
| KR | 10-2016-0043321 A | 4/2016 |
| KR | 10-1682896 B1 | 12/2016 |
| KR | 10-2017-0001327 A | 1/2017 |

OTHER PUBLICATIONS

European Search Report dated Sep. 2, 2019, issued in the European Application No. 18738693.3.

* cited by examiner

VEHICLE TERMINAL DEVICE AND CONTROL METHOD THEREOF

CROSS-REFERENCE TO RELATED APPLICATION(S)

This application claims the benefit under 35 U.S.C. § 119(a) of a Korean patent application filed on Jan. 10, 2017 in the Korean Intellectual Property Office and assigned Serial number 10-2017-0003373, the entire disclosure of which is hereby incorporated by reference.

TECHNICAL FIELD

The present disclosure relates to a vehicle terminal device and a control method thereof. More particularly, the present disclosure relates to a vehicle terminal device and a control method thereof for providing a vehicle accident management service.

BACKGROUND

Recently, the automobile industry has been integrated into various information technologies (ITs) to provide convenient driving services to a driver.

For example, recently, the automobile industry has provided a path service for wirelessly communicating with a traffic management device and an adjacent vehicle on a road and predicting a road situation of a user requested path to rapidly arrive at a destination as well as a service for guiding the user requested path.

In addition, recently, the automobile industry has provided a service for determining whether a vehicle appropriately travels in consideration of a driver state to feedback the driver state based on the determination result.

In particular, recently, the automobile industry has provided various services related to an accident involving a vehicle due to an increase in capabilities of vehicles.

A representative example is an alert service for alerting an emergency situation via an emergency rescue button installed in a vehicle. The alert service is used to rapidly perform a post-treatment of an accident involving a vehicle. However, the alert service has a problem as follows. When an accident involving a vehicle occurs, passengers including a driver need to directly push an emergency rescue button and, accordingly, when the passengers pass out or get out of the vehicle due to a significant accident, they cannot push the corresponding button and, thus, a post-treatment of an accident cannot be rapidly performed.

In addition, a person in charge of investigating an accident involving a vehicle determines a cause of the accident using only travel information recorded in a driving record device installed in the vehicle that gets into the accident and traffic information recorded in a traffic management device installed at a location at which the accident occurs.

As such, information for determining a cause of an accident involving a vehicle is limited and, thus, there is a problem in that a lot of time and numerous people are required to appropriately determine the cause of the accident by people in charge of investigating accidents involving a vehicle.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the abovementioned problems and/or disadvantages and to provide at least the advantages described below.

According to the present disclosure, when an accident involving a vehicle occurs, occurrence of the accident may be more rapidly and conveniently alerted to an external organization.

In addition, according to the present disclosure, when the accident occurs, a cause of the accident may be more rapidly and accurately recognized.

In accordance with an aspect of the present disclosure, a vehicle terminal device installed in a vehicle is provided. The vehicle terminal device includes a first communicator configured to communicate with an apparatus included in the vehicle using a first wireless communication, a second communicator configured to communicate with an apparatus outside the vehicle using a second wireless communication, a detector configured to detect state information of the vehicle, and a controller configured to control the second communicator to broadcast an accident alert message for alerting of an accident involving the vehicle to at least one of an apparatus included in an adjacent vehicle or a traffic management device in response to a determination of the accident based on the state information of the vehicle detected through the detector, and control the second communicator to transmit at least one of information received from the apparatus included in the vehicle through the first communicator or the state information of the vehicle detected through the detector, to an external server.

The accident alert message may include at least one of positional information of the vehicle, time information on a time point of detecting the accident, or identification information of the vehicle terminal device.

The accident alert message may be a message for transmitting traffic information including at least one of traffic signal information, vehicle speed information, time information, or image information captured that corresponds to at least one of a time or location of the accident, to the external server from at least one of the apparatus included in the adjacent vehicle or the traffic management device.

The accident alert message may be a message for transmitting traffic information including at least one of traffic signal information, vehicle speed information, time information, or image information captured that corresponds to at least one of a time or location of the accident, to the vehicle terminal device from at least one of the adjacent vehicle or the traffic management device, and, in response to the traffic information being received, the controller may control the second communicator to transmit the received traffic information to the external server.

The first communicator may communicate with at least one of a driving record device included in the vehicle or a terminal device of a passenger in the vehicle, and information received from the apparatus included in the vehicle may include at least one of travel information collected from the driving record device or passenger information received from the terminal device.

The state information of the vehicle may include at least one of speed information, vehicular indoor temperature, air quality information of the vehicle, distance information from the adjacent vehicle, captured image information of the passenger, airbag operation detection information, or a tire inflation pressure information.

The controller may control the second communicator to transmit information received from the apparatus included in the vehicle and the state information of the vehicle detected through the detector, to a first server, and to transmit only some of information received from the apparatus included in the vehicle and the state information of the vehicle detected through the detector, to a second server.

The controller may determine an accident level based on the state information of the vehicle detected through the detector and may control the second communicator to transmit all or some of the information received from the apparatus included in the vehicle based on the determined accident level, to the external server.

The controller may control the second communicator to transmit, to the external server, passenger information including emergency contact and human information among the received information when the accident level is a first level, to transmit, to the server, passenger information including emergency contact, blood information, and medical history information among the received information when the accident level is a second level, and to transmit, to the server, passenger information including all the received information when the accident level is a third level.

The controller may control the first communicator to transmit a control signal for performing an emergency call service operation to a terminal device of a passenger in the vehicle in response to the determined accident.

In accordance with another aspect of the present disclosure, a control method of a vehicle terminal device installed in a vehicle is provided. The method includes detecting state information of the vehicle, determining whether there is an accident involving the vehicle based on the state information of the vehicle, broadcasting an accident alert message for alerting of the accident to at least one of an apparatus included in an adjacent vehicle or a traffic management device, and transmitting at least one of information received from the apparatus included in the vehicle and the detected state information of the vehicle, to an external server.

The accident alert message may include at least one of positional information of the vehicle, time information on a time point of detecting the accident, or identification information of the vehicle terminal device.

The accident alert message may be a message for transmitting traffic information including at least one of traffic signal information, vehicle speed information, time information, or image information captured that corresponds to at least one of a time or location of the accident, to the external server from at least one of the apparatus included in the adjacent vehicle or the traffic management device.

The accident alert message may be a message for transmitting traffic information including at least one of traffic signal information, vehicle speed information, time information, or image information captured that corresponds to at least one of a time or location of the accident, to the vehicle terminal device from at least one of the adjacent vehicle or the traffic management device, and the transmitting to the external server may include, in response to the traffic information being received, transmitting the received traffic information to the external server.

The method may further include communicating with at least one of a driving record device included in the vehicle or a terminal device of a passenger in the vehicle, wherein information received from the apparatus included in the vehicle may include at least one of travel information collected from the driving record device or passenger information received from the terminal device.

The state information of the vehicle may include at least one of speed information, vehicular indoor temperature, air quality information of the vehicle, distance information from the adjacent vehicle, captured image information of the passenger, airbag operation detection information, or a tire inflation pressure information.

The transmitting to the external server may include transmitting information received from the apparatus included in the vehicle and the state information of the vehicle, to a first server, and transmitting only some of information received from the apparatus included in the vehicle and the state information of the vehicle, to a second server.

The transmitting to the external server may include determining an accident level based on the state information of the vehicle and transmitting all or some of the information received from the apparatus included in the vehicle based on the determined accident level, to the external server.

The transmitting to the external server may include transmitting, to the external server, passenger information including emergency contact and human information among the received information when the accident level is a first level, transmitting, to the server, passenger information including emergency contact, blood information, and medical history information among the received information when the accident level is a second level, and transmitting, to the server, passenger information including all the received information when the accident level is a third level.

The method may further include transmitting a control signal for performing an emergency call service operation to a terminal device of a passenger in the vehicle in response to the determined accident.

According to the diverse embodiments of the present disclosure, a vehicle terminal device may more rapidly and conveniently alert of an accident involving a vehicle to an external organization when the accident occurs.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
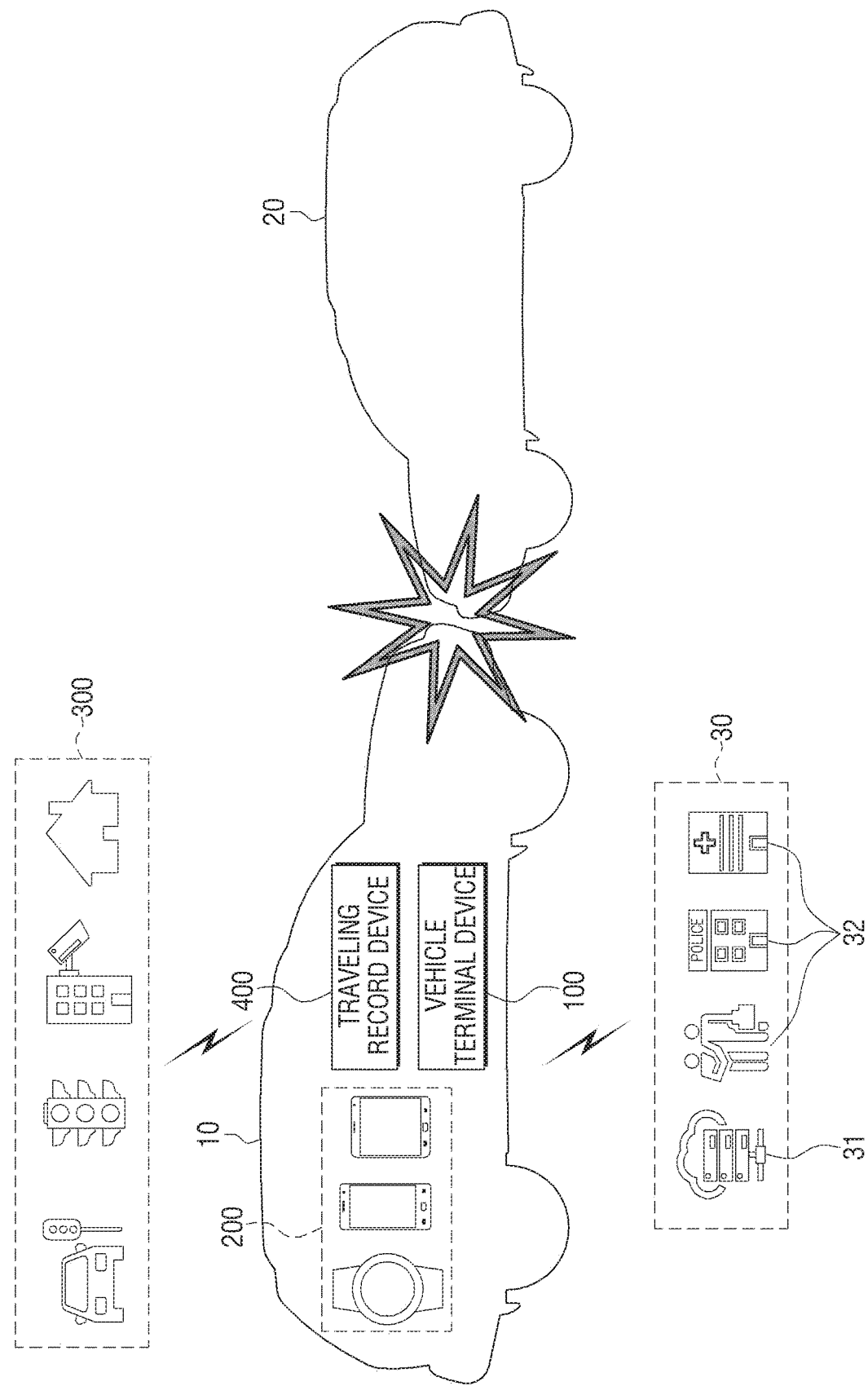
FIG. 1 is a diagram showing an accident management system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The same reference numeral used in the attached drawings refers to a component or element for performing substantially the same function. For convenience of description and understanding, the same reference is also used in different embodiments of the present disclosure. That is, even if all components having the same reference are shown in a plurality of drawings, the plurality of drawings does not refer to one embodiment of the present disclosure.

It will be understood that, although the terms first, second, etc. may be used herein to describe various elements, these terms are only used to distinguish one element from another element. These elements should not be limited by these terms. For example, an order in which elements used with the terms first, second, etc. are used or arranged is not limited by the terms. The terms can be interchangeably used.

The terms of a singular form may include plural forms unless otherwise specified. It will be further understood that the terms "comprises" or "comprising" when used in this specification, specify the presence of stated features, integers, operations, elements, components, or a combination thereof, but do not preclude the presence or addition of one or more other features, integers, operations, elements, components, or a combination thereof.

In the following description of the embodiment of the present disclosure, the terms such as "module", "unit", "part", etc. disclosed in the specification mean units for processing at least one function or operation, which may be implemented by hardware, software, or a combination thereof. In addition, a plurality of "modules", a plurality of "units", a plurality of "parts", etc. may be integrated into at least one module to be embodied by at least one processor (not shown) except for a "module", "unit", "part", etc. that is embodied as a specific hardware.

In embodiments of the present disclosure, when it is described that a certain part is "connected" to another part, it should be understood that the certain part may be directly connected to another part or indirectly connected to another part via another medium. In addition, when a certain part "includes" a certain component, this indicates that the part may further include another component instead of excluding another component unless there is no different disclosure.

FIG. 1 is a diagram showing an accident management system according to an embodiment of the present disclosure.

Referring to FIG. 1, the accident management system may include an apparatus included in a vehicle 10 and an apparatus outside the vehicle 10.

The apparatus included in the vehicle 10 may include at least one of a vehicle terminal device 100 and a driving record device 400 that are installed in the vehicle 10, or a terminal device 200 of a driver and a fellow passenger (hereinafter, referred to as a passenger) in the vehicle 10.

The apparatus outside the vehicle 10 may include an apparatus included in an adjacent vehicle 20 and a traffic management device 300. Here, the apparatus included in the adjacent vehicle 20 may include at least one of the vehicle terminal device 100 and the driving record device 400 that are included in the vehicle 10, or the terminal device 200 of a driver and a fellow passenger (hereinafter, referred to as a passenger) in the vehicle 10. In addition, the traffic management device 300 may be a device that is installed on a road to monitor a road traffic situation and to control traveling of vehicle and may include, for example, a traveling display device, a speeding detection device, and an image capturing device for monitoring a road state.

In detail, the vehicle terminal device 100 included in the vehicle 10 may receive passenger information from the terminal device 200 using a first wireless communication when being communicatively connected to the terminal device 200 of the passenger in the vehicle 10. Here, the first wireless communication may be a short distance communication method.

For example, when the passenger in the vehicle 10 is a driver and a fellow passenger, the vehicle terminal device 100 may receive passenger information from the terminal device 200 of each of the driver and the fellow passenger.

Here, the terminal device 200 may be a display device such as a smartphone or a wearable device such as a smartwatch. In addition, the passenger information may include passenger human information such as a passenger name, age, sex, address, body information, and emergency contact and passenger biometric information such as a passenger heart rate and pulse rate. In addition, the passenger information may further include terminal information on the terminal device 200.

Here, the terminal information may further include identification information, positional information, and speed information of the terminal device 200 and control information for controlling an operation of the terminal device 200. For example, the control information may be a control signal for emergency call for an organization for treatment of an accident when the accident occurs.

As such, the vehicle terminal device 100 that communicates with the terminal device 200 of the passenger in the vehicle 10 using the first wireless communication to receive passenger information may periodically receive the passenger information.

However, the present disclosure is not limited thereto. When first communicating with the terminal device 200, the vehicle terminal device 100 may receive only passenger information including identification information of the terminal device 200 and human information from the terminal device 200, and when an event such as an accident occurs, the vehicle terminal device 100 may make a request for the remaining information, i.e., passenger biometric information and terminal information and may receive the requested information.

When power is supplied to the driving record device 400 installed in the vehicle 10, the vehicle terminal device 100 may communicate with the driving record device 400 using the first wireless communication and may periodically receive travel information collected from the driving record device 400.

However, the present disclosure is not limited thereto. When an event such as an accident occurs, the vehicle terminal device 100 may make a request for travel information collected from the driving record device 400 and may receive the requested information.

Here, the travel information may include at least one of vehicle speed information, time information, or image information obtained according to event that occurs when the vehicle 10 parks or stops.

The vehicle terminal device 100 may collect state information of the vehicle 10 while the vehicle 10 travels and may determine whether an accident occurs based on the collected state information. However, the present disclosure is not limited thereto. The vehicle terminal device 100 may also collect state information of the vehicle 10 while the vehicle 10 stops or parks and may determine whether an accident occurs based on the collected state information.

Here, the state information may include at least one of speed information, vehicular indoor temperature, and air quality information of the vehicle 10, distance information from an adjacent vehicle, captured image information of a passenger, airbag operation detection information, or a tire inflation pressure information. Accordingly, the vehicle terminal device 100 may determine whether an accident occurs based on the state information of the vehicle 10.

Upon determining that the accident occurs, the vehicle terminal device 100 may broadcast an accident alert message for alerting that an accident occurs. Here, the accident alert message may include at least one of positional information of the vehicle 10, time information of detecting an accident, or identification information of the vehicle terminal device 100.

Upon determining that an accident occurs, the vehicle terminal device 100 may transmit various information items received from the terminal device 200 of the passenger in the vehicle 10 and the driving record device 400 included in the vehicle 10 or state information of the vehicle 10, to the external server 30.

Here, the external server 30 may include a first server 31 (e.g., a cloud server) for storing traffic accident related information and a second server 32 (e.g., an organization server) that is in charge of treating a traffic accident.

A vehicle terminal device 100 of the adjacent vehicle 20 that travels through a point in which an accident occurs among the plurality of adjacent vehicles 20 and the traffic management device 300 positioned at the point in which the accident occurs may receive the accident alert message transmitted from the vehicle terminal device 100.

In detail, upon receiving the accident alert message, the vehicle terminal device 100 of the adjacent vehicle 20 that travels through the point in which the accident occurs may transmit traffic information collected from the vehicle terminal device 100, to the external server 30. Here, the traffic information may include at least one of speed information of the adjacent vehicle 20, time information, or image information obtained by photographing a section including a point in which the accident occurs.

That is, upon receiving an accident alert message, the vehicle terminal device 100 of the adjacent vehicle 20 may receive the traffic information from at least one of a driving record device 400 that communicates with the vehicle terminal device 100 using the first wireless communication or a terminal device 200 of a passenger in the adjacent vehicle 20 and may transmit the collected traffic information to the external server 30. Here, the external server 30 may include the first server 31 for storing traffic accident related information. That is, upon receiving the accident alert message, the vehicle terminal device 100 of the adjacent vehicle 20 may transmit traffic information of a section including a point in which an accident occurs, to the first server 31.

Upon receiving an accident alert message, the traffic management device 300 positioned in a section including a point in which an accident occurs may transmit traffic information including traffic signal information, image information obtained at a time point when the accident occurs, etc. based on the received accident alert message, to the first server 31.

The present disclosure is not limited thereto. The vehicle terminal device 100 of the adjacent vehicle 20 that receives the accident alert message and the traffic management device 300 may transmit traffic information including a point in which an accident occurs, to the vehicle terminal device 100 of the vehicle 10. In this case, upon receiving traffic information from at least one of the vehicle terminal device 100 of the adjacent vehicle 20 or the traffic management device 300, the vehicle terminal device 100 may transmit the received traffic information to the first server 31.

As described above, upon determining that an accident occurs, the vehicle terminal device 100 may transmit various information items received from the terminal device 200 of the passenger in the vehicle 10 and the driving record device 400 included in the vehicle 10 or state information of the vehicle 10, to the external server 30.

In detail, upon determining that an accident occurs, the vehicle terminal device 100 may transmit all information items received from the terminal device 200 of the passenger in the vehicle 10 and the driving record device 400 included in the vehicle 10, to the first server 31.

The vehicle terminal device 100 may transmit only some of information received from the terminal device 200 of the passenger in the vehicle 10 and the driving record device 400 included in the vehicle 10, to the second server 32.

For example, the vehicle terminal device 100 may transmit passenger information received from the terminal device 200 of the passenger in the vehicle 10, to the second server 32 of a lifesaving organization among the servers 32 and, may transmit state information of the vehicle 10 detected during traveling and travel information received from the driving record device 400, to the second server 32 of an organization (e.g., a police station and an insurer) in charge of treatment of a traffic accident.

As such, when the vehicle 10 gets into an accident, an accident management system according to the present disclosure may provide only information required for each organization in charge of treatment of a traffic accident when an accident occurs as well as may upload, to the first server 31, all information items collected from the vehicle 10 that gets into the accident, the adjacent vehicle 20 that travels through a point in which the accident occurs, and the traffic management device 300 installed in a section in which the accident occurs and, thus, may rapidly and accurately perform post-treatment of the accident.

Thus far, the accident management system according to the present disclosure has been described briefly. Hereinafter, components of the vehicle terminal device 100 according to the present disclosure will be described in detail.

Figure 2:
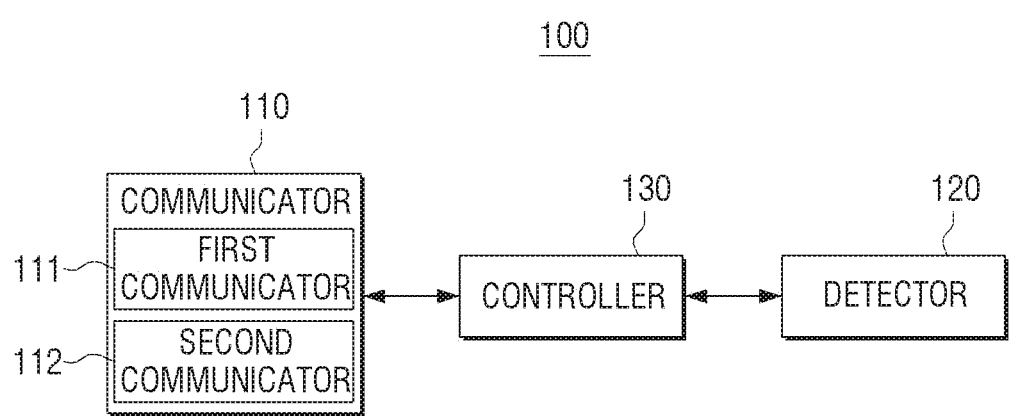
FIG. 2 is a block diagram of a vehicle terminal device according to an embodiment of the present disclosure.

FIG. 2 is a block diagram of the vehicle terminal device 100 according to an embodiment of the present disclosure.

Referring to FIG. 2, the vehicle terminal device 100 may include a communicator 110, a detector 120, and a controller 130.

The communicator 110 may include first and second communicators 111 and 112. The first communicator 111 may communicate with an apparatus included in the vehicle 10 using the first wireless communication. Here, the first wireless communication may be a communication method that performs communication through a short distance module such as a Bluetooth (BT) module, an infrared data association (IrDA) module, a near field communication (NFC) module, a WiFi module, and a Zigbee module.

The second communicator 112 may communicate with an apparatus outside the vehicle 10 using a second wireless communication. Here, the second wireless communication method may be a communication method that performs communication through a mobile communication module that accesses a mobile communication network and performs communication according to various mobile communication standards such as $3^{rd}$ generation (3G), $3^{rd}$ generation partnership project (3GPP), and long term evolution (LTE).

The detector 120 may detect state information of the vehicle 10. Here, the state information of the vehicle 10 may include at least one of speed information, vehicular indoor temperature, and air quality information of the vehicle 10, distance information from an adjacent vehicle, captured image information of a passenger in the vehicle 10, airbag operation detection information, or a tire inflation pressure information.

To detect the state information, the detector 120 may include an accelerometer sensor, a gyroscope sensor, a proximity sensor, a temperature and air quality detection sensor, an airbag sensor, a tire inflation pressure sensor, an impact sensor, a camera, or the like.

However, the present disclosure is not limited thereto. The detector 120 may further include a terrestrial magnetism sensor and a gravity sensor for detection of a position of the vehicle 10, a lane departure detection sensor for detection of lane departure of the traveling vehicle 10, and the like.

The accelerometer sensor may measure acceleration of the moving vehicle 10 or impact intensity and the gyroscope sensor may be formed by applying rotation to an existing accelerometer sensor to recognize six-axis directions and to facilitate recognition of detailed and fine operations.

The proximity sensor may detect whether the adjacent vehicle 20 approaches based on the traveling vehicle 10 and the temperature and air quality detection sensor may measure concentration of carbon dioxide ($CO_2$) and temperature in the vehicle 10.

The airbag sensor may detect whether an airbag for protection of a passenger body from a crash accident of the vehicle 10 is operated and the tire inflation pressure sensor may measure and detect a tire inflation pressure state of the vehicle 10. The camera may be a sensor for photographing a passenger in the vehicle 10.

The terrestrial magnetism sensor may detect a position of the vehicle 10, the gravity sensor may detect a direction in which gravity acts to detect a direction of the vehicle 10, and the lane departure detection sensor may detect whether the traveling vehicle 10 normally travels without departing from lanes. The impact sensor may detect impact intensity of a vehicle. Whether an airbag is operated may be determined according to impact intensity detected through the impact sensor.

The detector 120 according to the present disclosure may detect various state information items through a sensor for detecting a state of the vehicle 10 and a state of a passenger in the vehicle 10 other than the aforementioned sensors.

Upon detecting the state information of the vehicle 10 through the various sensors, the controller 130 may determine whether an accident occurs based on the detected state information of the vehicle 10.

According to an embodiment of the present disclosure, the controller 130 may predict that an accident will occur upon detecting that driving speed of the vehicle 10 detected through the detector 120 is reduced below first threshold speed or is suddenly increased to a second threshold speed or more within a predetermined threshold time.

According to another embodiment of the present disclosure, the controller 130 may predict that an accident will occur upon detecting that a distance from the adjacent vehicle 20 is less than a predetermined threshold distance based on the traveling vehicle 10 through the detector 120.

According to another embodiment of the present disclosure, the controller 130 may predict that an accident will occur upon detecting that a temperature inside the vehicle 10 detected through the detector 120 is equal to or greater than a predetermined temperature value or concentration of $CO_2$ in the vehicle 10 is equal to or greater than a predetermined threshold concentration value.

According to another embodiment of the present disclosure, the controller 130 may predict that an accident will occur upon detecting an event in which an airbag installed in the vehicle 10 is operated, an event in which a tire inflation pressure is less than a threshold value, or an event in which a vehicle departs from a current lane.

According to another embodiment of the present disclosure, the controller 130 may predict that an accident will occur upon detecting that a sensing value of impact intensity detected through the detector 120 is equal to or greater than a predetermined threshold value.

According to various embodiments of the present disclosure, upon predicting whether an accident occurs, the controller 130 may combine the prediction results about accident occurrence to lastly determine whether the accident occurs.

For example, upon predicting that an accident occurs based on three detection information items or more, the controller 130 may determine that the accident occurs.

However, the present disclosure is not limited thereto. Upon predicting that an accident occurs based on detection information items, the number of which is equal to or greater than a number set by a user, the controller 130 may determine that the accident occurs.

According to the present embodiment, upon determining that an accident occurs, the controller 130 may generate an accident alert message for alerting that the accident occurs, to at least one of the apparatus included in the adjacent vehicle 20 or the traffic management device 300. Then, the controller 130 may control the second communicator 112 to broadcast the accident alert message. Accordingly, the second communicator 112 may broadcast the accident alert message.

Upon determining that the accident occurs, the controller 130 may control the second communicator 112 to transmit at least one of information received from the apparatus included in the vehicle 10 and the state information of the vehicle 10 detected through the detector 120, to the external server 30 through the first communicator 111. Accordingly, the second communicator 112 may transmit at least one of the information received from the apparatus included in the vehicle 10 and the state information of the vehicle 10 detected through the detector 120, to the external server 30.

Here, the apparatus included in the adjacent vehicle 20 may be the vehicle terminal device 100 of the adjacent vehicle 20. Accordingly, the vehicle terminal device 100 of the adjacent vehicle 20 that travels in a section including a corresponding accident point at a time point when the accident occurs among the plurality of adjacent vehicles 20 may receive an accident alert message that is broadcast from the vehicle terminal device 100 of the vehicle 10 that gets into the accident.

The traffic management device 300 may be installed on a road to monitor a road traffic situation, may manage road traffic such as control of vehicle traveling, and may include, for example, a traveling display device, a speeding detection device, and an image capturing device for monitoring a road state. The at least one traffic management device 300 installed in a section including a point in which an accident among the plurality of traffic management devices 300 may receive the accident alert message that is broadcast from the vehicle terminal device 100 of the vehicle 10 that gets into the accident.

The apparatus included in the vehicle 10 may include at least one of the terminal device 200 of a passenger in the vehicle 10 or the driving record device 400 for recording a traveling state of the vehicle 10.

Here, the terminal device 200 may be a display device such as a smartphone or a wearable device such as a smartwatch. In addition, the passenger information may include passenger human information such as a passenger name, age, sex, address, body information, and emergency contact and passenger biometric information such as a passenger heart rate and pulse rate. In addition, the passenger information may further include terminal information on the terminal device 200.

Here, the terminal information may further include identification information, positional information, and speed information of the terminal device 200 and control information for controlling an operation of the terminal device 200. For example, the control information may be a control signal for emergency call for an organization for treatment of an accident involving a vehicle when the accident occurs.

The driving record device 400 may collect travel information of the traveling vehicle 10 and may be, for example, a black box. The travel information collected from the driving record device 400 may include at least one of vehicle speed information, time information, or image information obtained according to event that occurs when the vehicle 10 travels or stops.

That is, when power is supplied to the vehicle terminal device 100, the controller 130 may control the first communicator 111 to communicate with the driving record device 400 and the terminal device 200 of the passenger in the vehicle 10. Accordingly, the vehicle terminal device 100 may be communicatively connected to the terminal device 200 and the driving record device 400 through the first communicator 111 using the first wireless communication.

Upon being communicatively connected to the terminal device 200 and the driving record device 400, the first communicator 111 may transmit and receive a check signal for periodically determining a communication connection state with the terminal device 200 and the driving record device 400.

Upon determining that an accident occurs based on the state information detected through the detector 120, the controller 130 may control the first communicator 111 to make a request for passenger information and to receive the passenger information from the terminal device 200 of the passenger and to make a request for travel information of the vehicle 10 and to receive the travel information from the terminal device 200 of the passenger. Accordingly, upon receiving the passenger information and the travel information from the terminal device 200 and the driving record device 400, the controller 130 may transmit at least one of the received passenger information, travel information, or the state information of the vehicle 10 detected through the detector 120, to the external server 30.

However, the present disclosure is not limited thereto. The controller 130 may control the first communicator 111 to periodically make a request for passenger information and travel information and to receive the requested information from the terminal device 200 and the driving record device 400. Accordingly, upon receiving the passenger information and the travel information from the terminal device 200 and the driving record device 400 through the first communicator 111, the controller 130 may store the received information in a storage 140 that will be described later. In this case, the controller 130 may delete first stored information among information items pre-stored in the storage 140 and may store the received passenger information and travel information in the storage 140.

Then, upon determining that an accident occurs based on the state information detected through the detector 120, the controller 130 may acquire the passenger information and travel information pre-stored in the storage 140 around a time point in which the accident occurs and may transmit the acquired information to the external server 30.

Here, the external server 30 may include a first server 31 (e.g., a cloud server) for storing traffic accident related information and a second server 32 (e.g., an organization server) that is in charge of treating a traffic accident.

The aforementioned accident alert message may include at least one of positional information of the vehicle 10, time information of detecting an accident, or identification information of the vehicle terminal device 100.

The accident alert message may be used to transmit traffic information including at least one of traffic signal information, vehicle speed information, time information, or image information acquired in a section including a point in which an accident occurs, to the external server 30 from at least one of the vehicle terminal device 100 of the adjacent vehicle 20 or the traffic management device 300.

In this case, upon receiving the accident alert message, at least one of the vehicle terminal device 100 of the adjacent vehicle 20 or the traffic management device 300 may transmit traffic information collected from at least one of the vehicle terminal device 100 or the traffic management device 300, to the external server 30.

In detail, upon receiving the accident alert message, the vehicle terminal device 100 of the adjacent vehicle 20 may make a request for the travel information collected from the driving record device 400 included in the adjacent vehicle 20 and the passenger information collected from the terminal device 200 of a passenger in the adjacent vehicle 20 and may receive the requested information. Then, the vehicle terminal device 100 of the adjacent vehicle 20 may acquire traffic information related to a point in which an accident occurs from the travel information and passenger information received from the driving record device 400 and the terminal device 200 and the state information of the adjacent vehicle 20 collected from the vehicle terminal device 100, based on information (positional information and time information) included in the accident alert message. Then, the vehicle terminal device 100 of the adjacent vehicle 20 may transmit the pre-acquired traffic information related to the point in which the accident occurs, to the external server 30. That is, the vehicle terminal device 100 of the adjacent vehicle 20 may transmit the pre-acquired traffic information related to the point in which the accident occurs, to the first server 31.

Upon receiving the accident alert message, the traffic management device 300 may acquire traffic information including at least one of traffic signal information, image information, or vehicle speed information recorded around a time point in which the accident occurs, based on information (positional information and time information) included in the received accident alert message and may transmit the acquired traffic information to the first server 31.

The accident alert message may be used to transmit traffic information including at least one of traffic signal information, vehicle speed information, time information, or image information acquired in a section including a point in which an accident occurs, to the vehicle terminal device 100 of the vehicle 10, which transmitting the accident alert message, from at least one of the vehicle terminal device 100 of the adjacent vehicle 20 or the traffic management device 300.

In this case, the vehicle terminal device 100 of the adjacent vehicle 20 and the traffic management device 300 that receive the accident alert message may acquire traffic information based on the information included in the accident alert message and may transmit the traffic information to the vehicle terminal device 100 of the vehicle 10 that transmits the accident alert message, as described above.

In this case, upon receiving traffic information from at least one of the vehicle terminal device 100 of the adjacent vehicle 20 or the traffic management device 300 through the second communicator 112, the controller 130 may transmit the received traffic information to the first server 31 for storing traffic accident related information and the second server 32 of an organization that is in charge of treatment of a traffic accident.

As described above, as an accident occurs, upon receiving the passenger information from the terminal device 200 included in the vehicle 10 and the travel information from the driving record device 400, the controller 130 may control the second communicator 112 to transmit all information items including the received passenger information and travel information, and state information of the vehicle 10 detected through the detector 120 to the first server 31 for storing the traffic accident related information and to transmit only some information to the second server 32 of an organization that is in charge of treatment of a traffic accident.

Thus, the second communicator 112 may transmit all information items including the passenger information, the travel information, and state information of the vehicle 10 to the first server 31. The second communicator 112 may transmit only some information of the passenger information, the travel information, and the state information of the vehicle 10 to the second server 32. Here, the first server 31 may be a cloud server for storing the traffic accident related information and the second server 32 may include an insurer server, a police station server, a lifesaving center server, or the like.

In some embodiments, the second communicator 112 may transmit the passenger information and the travel information to an insurer server, may transmit state information of the vehicle 10 and the travel information to a police station server, and may transmit passenger information of a passenger in the vehicle 10 to a lifesaving center server, according to a control command of the controller 130.

According to an additional aspect of the present disclosure, the controller 130 may determine an accident level based on the state information of the vehicle 10 detected through the detector 120 and may control the second communicator 112 to transmit all or some information received from the apparatus included in the vehicle 10 to the external server 30 based on the determined accident level.

In detail, the controller 130 may control the second communicator 112 to transmit, to the external server 30, passenger information including emergency contact and human information among the received information items when the accident level is a first level, to transmit, to the external server 30, a passenger level including emergency contact, blood information, and medical history information among the received information items when the accident level is a second level, and to transmit, to the external server 30, passenger information including all the received information items when the accident level is a third level.

According to the control command, the second communicator 112 may transmit passenger information including information that is changed according to an accident level to the external server 30.

In detail, as described above, the controller 130 may determine an accident level based on a detection result of an accident detected through the detector 120.

For example, upon determining that an accident occurs, the controller 130 may compare a sensing value of impact intensity detected through an impact sensor and a predetermined threshold value to determine an accident level.

In detail, the controller 130 may determine the accident level as a first level when the sensing value of the impact intensity detected through the impact sensor is greater than a predetermined first threshold value and is less than a second threshold value and may determine the accident level as a second level when the sensing value is greater than the second threshold value. Upon detecting that an airbag is operated through the detector 120, the controller 130 may determine the accident level as a third level.

Upon determining that the accident level as the first level, the controller 130 may control the second communicator 112 to transmit, to a lifesaving center server, only passenger information including emergency contact and human information (name, sex, age, and height) of a passenger among information items included in the passenger information received from the terminal device 200.

Upon determining the accident level as a second level, the controller 130 may control the second communicator 112 to transmit, to a lifesaving center server, only passenger information including emergency contact, human information of a passenger, and medical history information of the passenger among the information items included in the passenger information received from the terminal device 200.

Upon determining the accident level as the third level, the controller 130 may control the second communicator 112 to transmit all the information items included in the passenger information received from the terminal device 200 to the lifesaving center server.

Accordingly, the second communicator 112 may transmit passenger information for each accident level to the lifesaving center server. Accordingly, a person in charge of a manager in the lifesaving center may predict an injury state of a passenger based on the passenger information received from the vehicle terminal device 100 of the vehicle 10 that gets into an accident and may perform emergency rescue activity in consideration of the predicted injury state.

According to an additional aspect of the present disclosure, upon determining that an accident occurs, the controller 130 may control the first communicator 111 to transmit a control signal for performing an emergency call service operation to the terminal device 200 based on the passenger information received from the terminal device 200 of a passenger in the vehicle 10. Accordingly, the first communicator 111 may transmit the control signal to the terminal device 200. The terminal device 200 that receives the control signal may execute an emergency call service related program to perform call related to emergency situation occurrence on the external server 30 based on the control signal received from the vehicle terminal device 100.

In detail, upon determining that an accident occurs, the controller 130 may transmit a control signal for the emergency call service to the corresponding terminal device 200 based on terminal information received from the terminal device 200 of the passenger in the vehicle 10. Accordingly, the terminal device 200 may transmit an alert message related to emergency situation occurrence to a predetermined organization server, for example, a lifesaving center server or a police station server, based on the control signal received from the vehicle terminal device 100.

Hereinafter, a detailed configuration of the vehicle terminal device 100 according to the present disclosure will be described in detail.

Figure 3:
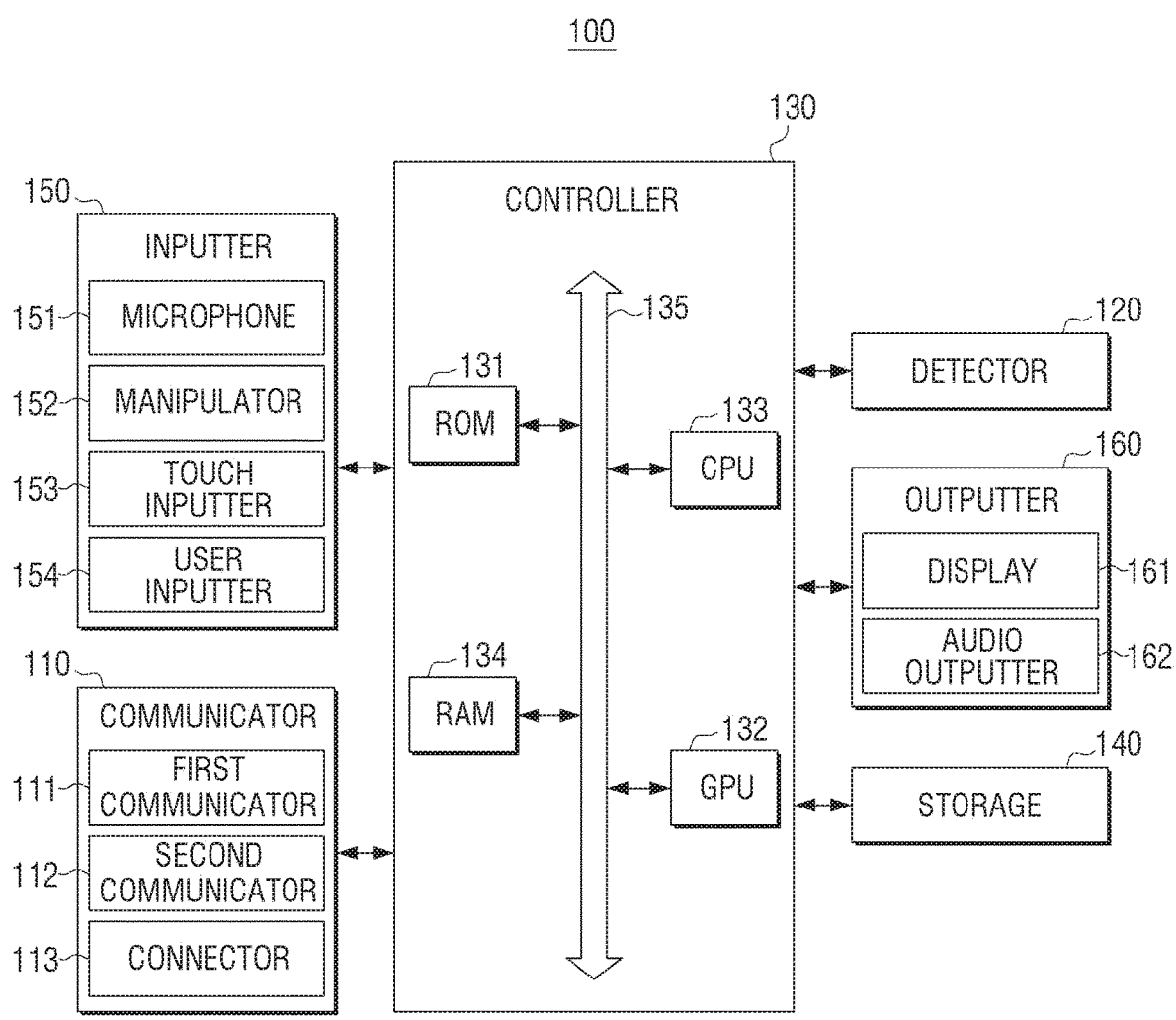
FIG. 3 is a detailed block diagram of a vehicle terminal device according to an embodiment of the present disclosure.

FIG. 3 is a detailed block diagram of a vehicle terminal device according to an embodiment of the present disclosure.

Referring to FIG. 3, when the aforementioned vehicle terminal device 100 is installed in the vehicle 10 to enable path guidance and content reproduction like in a navigation device, the vehicle terminal device 100 may further include the storage 140, an inputter 150, and an outputter 160 other than the aforementioned components.

The storage 140 may store information received from apparatuses included in the vehicle 10. The storage 140 may further store an operating program for control of an operation of the vehicle terminal device 100. Here, the operation program may be a program that is read from the storage 140 and compiled to operate each of the components of the vehicle terminal device 100 when the vehicle terminal device 100 is turned on. The storage 140 may be embodied as at least one of read-only memory (ROM) 131, random-access memory (RAM), or a memory card (e.g., a secure digital (SD) card and a memory stick), a non-volatile memory, a volatile memory, a hard disk drive (HDD), or a solid state driver (SSD), which is detachable/mountable in the vehicle terminal device 100, which will be described below.

The aforementioned controller 130 may control an overall operation of the vehicle terminal device 100 or may be a processing apparatus for controlling an overall operation of the vehicle terminal device 100. The controller 130 may include a central processing unit (CPU) 133, a ROM 131, a RAM 134, and a graphics processing unit (GPU) 132 and the CPU 133, the ROM 131, the RAM 134, and the GPU 132 may be connected to each other through a bus 135.

The CPU 133 may access the storage 140 to perform booting using an operating system (OS) system program stored in the storage 140. The CPU 133 may perform various operations using various programs, contents, data, and the like stored in the storage 140.

The ROM 131 may store a command set and the like for system booting. When a turn on command is input to supply power to the CPU 133, the CPU 133 may copy the OS stored in the storage 140 to the RAM according to the command stored in the ROM 131 and may execute the OS to boot a system. Upon completing booting, the CPU 133 may copy various programs stored in the storage 140 to the RAM 134 and may execute the program copied to the RAM 134 to perform various operations.

The GPU 132 may generate a display image including various objects such as an icon, an image, and a text. In detail, the GPU 132 may calculate an attribute value such as a coordinate value, shape, and color for displaying each object according to a layout of an image based on the received control command and may generate a display image with various layouts including an object based on the calculated attribute value.

The controller 130 may be integrated into the aforementioned communicator 110 and detector 120, and each component that will be described below to embody a system-on-a-chip or a system on chip (SoC).

The aforementioned communicator 110 may further include a connector 113 other than the aforementioned first and second communicators 111 and 112.

The connector 113 may be a component for providing an interface with various source devices such as universal serial bus (USB) 2.0, USB 3.0, high definition multimedia interface (HDMI), and Institute of Electrical and Electronics Engineers (IEEE) 1394. The connector 113 may receive content stored in an external record medium from the external record medium that is physically connected to the vehicle terminal device 100 through a wired cable or may transmit the content to the external record medium. In addition, the connector 113 may receive power from a power source through a wired cable that is physically connected to the connector 113.

The inputter 150 may be an input device for receiving various user command and transmitting the various user commands to the controller 130 and may include a microphone 151, a manipulator 152, a touch inputter 153, and a user inputter 154, as shown in FIG. 3.

The microphone 151 may receive a user voice command and the manipulator 152 may be embodied as a keypad including various functional keys, a number key, a special key, a character key, and so on. When a display 161 included in the outputter 160 that will be described below is embodied in the form of a touch screen, the touch inputter 153 may be embodied as a touch pad that configures an interlayer structure with the display 161. In this case, the touch inputter 153 may receive a selection command of various application related icons displayed through the display 161.

The user inputter 154 may receive an IR signal or an RF signal for control of an operation of the vehicle terminal device 100 from at least one peripheral device (not shown) such as a remote control device.

The outputter 160 may be a component for outputting content and may include the display 161 for outputting an image of the content and an audio outputter 162 for outputting audio of the content.

The display 161 may be embodied as a liquid crystal display (LCD), an organic light emitting display (OLED), a plasma display panel (PDP), or the like. In particular, the display 161 may be embodied in the form of a touchscreen that configures an interlayer structure with the touch inputter 153 that receives the aforementioned user touch command.

Figure 4:
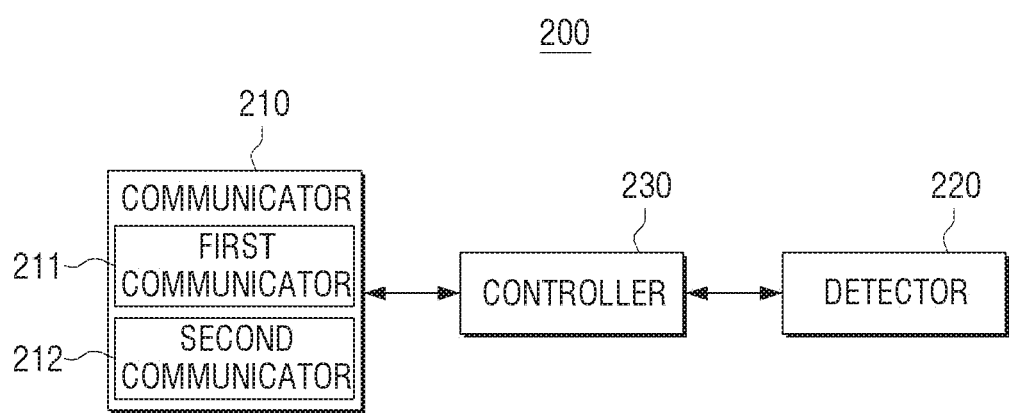
FIG. 4 is a block diagram of a terminal device according to an embodiment of the present disclosure.

FIG. 4 is a block diagram of the terminal device 200 according to an embodiment of the present disclosure.

Referring to FIG. 4, the terminal device 200 may be a portable terminal device of a passenger in the vehicle 10 and may be, for example, a display device such as a smartphone or a wearable device such as a smartwatch.

The terminal device 200 may include a communicator 210, a detector 220, and a controller 230.

The communicator 210 may include first and second communicators 211 and 212.

The first communicator 211 may communicate with the vehicle terminal device 100 included in the vehicle 10 and another apparatus included in the vehicle 10 using a first wireless communication. Here, the first wireless communication may be a communication method that performs communication through a short distance module such as a BT module, an IrDA module, an NFC module, a WiFi module, and a Zigbee module.

The second communicator 212 may perform wireless communication using a second wireless communication. Here, the second wireless communication method may be a communication method that performs communication through a mobile communication module that accesses a mobile communication network and performs communication according to various mobile communication standards such as 3G, 3GPP, and LTE.

The detector 220 may be a detector sensor for detecting at least one of movement of the terminal device 200 or passenger biometric information and may detect the speed, direction, and position of the terminal device 200, for example, an accelerometer sensor, a terrestrial magnetism sensor, a gravity sensor, and a gyroscope sensor or passenger biometric information such as a heart rate and a pulse rate of a passenger.

The controller 230 may control an overall operation of components included in the terminal device 200. In particular, upon beginning communication with the vehicle terminal device 100, the controller 230 may transmit terminal information including pre-stored passenger information of a passenger to the vehicle terminal device 100 through the first communicator 211.

In detail, upon beginning communication with the vehicle terminal device 100, the controller 230 may transmit passenger information including passenger information and human information that are pre-stored in the terminal device 200 through the first communicator 211.

Then, the controller 230 may periodically transmit and receive a signal to and from the vehicle terminal device 100 through the first communicator 211 to determine a communication connection state with the vehicle terminal device 100.

Upon receiving an accident related event signal from the vehicle terminal device 100 through the first communicator 211, the controller 230 may transmit passenger biometric information and terminal information detected through the detector 220, to the vehicle terminal device 100 through the first communicator 211. Here, the biometric information may include at least one of heart rate or pulse rate information of a passenger. The terminal information may further include identification information and positional information of the terminal device 200, and control information for control of an operation of the terminal device 200. For example, the control information may be a control signal for emergency call to an organization for treatment of an accident when the accident occurs.

Hereinafter, an operation of transmitting pre-collected information to the external server 30 from the vehicle terminal device 100 according to the present disclosure will be described below in detail.

Figure 5:
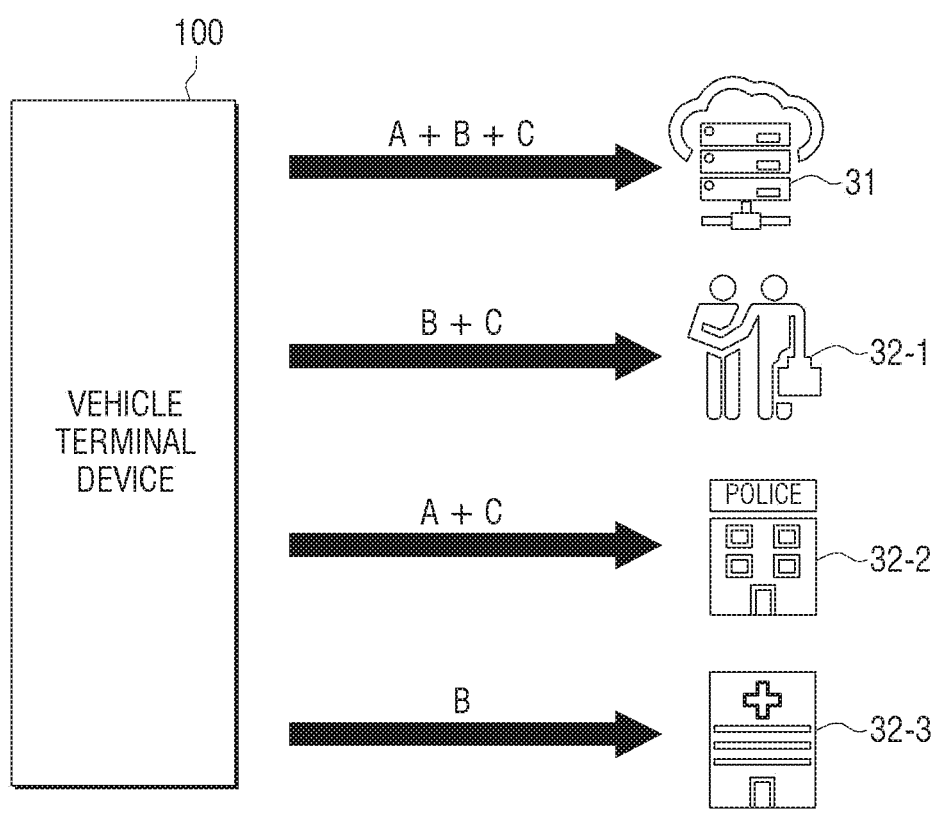
FIG. 5 is a diagram showing an example of transmission of pre-collected information to an external server from a vehicle terminal device according to an embodiment of the present disclosure.

FIG. 5 is a diagram showing an example of transmission of pre-collected information to an external server from a vehicle terminal device according to an embodiment of the present disclosure.

As described above, upon determining that an accident occurs based on state information detected through the detector 120, the vehicle terminal device 100 may transmit information collected from apparatuses included in the vehicle 10, to the external server 30.

In detail, upon determining that an accident occurs based on the state information detected through the detector 120, the vehicle terminal device 100 may receive passenger information from the terminal device 200 of a passenger in the vehicle 10 and travel information from the driving record device 400 installed in the vehicle 10.

Referring to FIG. 5, the vehicle terminal device 100 may transmit state information A detected through the detector 120, passenger information B received from the terminal device 200, and the travel information C received from the driving record device 400, to the first server 31 as a cloud server for storing traffic accident related information.

The vehicle terminal device 100 may transmit some of the state information A detected through the detector 120, the passenger information B received from the terminal device 200, and the travel information C received from the driving record device 400, to the second server 32. Here, the second server 32 may include the insurer server 32-1, a police station server 32-2, and a lifesaving center server 32-3.

In this case, the vehicle terminal device 100 may transmit the passenger information B and the travel information C among the state information A, the passenger information B, and the travel information C of a vehicle, to the insurer server 32-1. The vehicle terminal device 100 may transmit he state information A and the travel information C of the vehicle, to the police station server 32-2 and may transmit the passenger information B to the lifesaving center server 32-3.

That is, the vehicle terminal device 100 may transmit only information required for each organization during an accident and, thus, a person in charge of each organization may rapidly treat the accident based on the information received from the vehicle terminal device 100.

In addition, the first server 31 may receive and store all of information collected from the vehicle 10 that gets into the accident, information collected from the adjacent vehicle 20 that travels in a section in which the accident occurs, and information collected from the traffic management device 300 installed at a location at which the accident occurs and, thus, a person in charge of each organization may recognize the more accurate accident cause with reference to the information stored in the first server 31 and may treat the accident.

Upon determining that an accident occurs, the vehicle terminal device 100 according to the present disclosure may differently transmit passenger information of a passenger in the vehicle 10 to the lifesaving center server 32-3 according to an accident degree.

Figure 6:
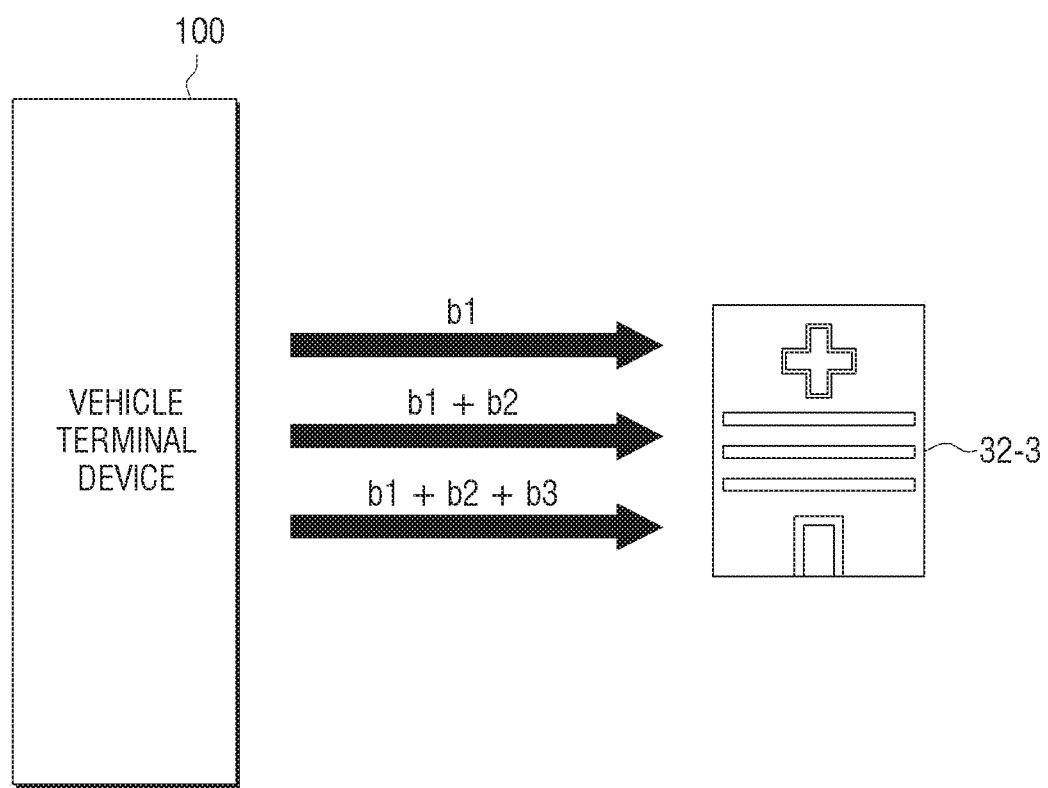
FIG. 6 is a diagram showing an example of different transmission of passenger information to a lifesaving center server according to an accident degree by a vehicle terminal device according to an embodiment of the present disclosure.

FIG. 6 is a diagram showing an example of different transmission of passenger information to a lifesaving center server according to an accident degree by a vehicle terminal device according to an embodiment of the present disclosure.

Referring to FIG. 6, upon determining that an accident occurs based on the state information of the vehicle 10 detected through the detector 120, the vehicle terminal device 100 may determine an accident level of the accident and may transmit all or some of the passenger information to the lifesaving center server 32-3 based on the determined accident level.

As described above, upon determining that the accident occurs based on the state information of the vehicle 10 detected through the detector 120, the vehicle terminal device 100 may determine an accident level based on a sensing value of impact intensity sensed through an impact sensor.

For example, when the sensing value sensed through the impact sensor is greater than a predetermined first threshold value and is less than a second threshold value, the vehicle terminal device 100 may determine the accident level of the accident as a first level.

Upon determining that the accident level as the first level, the vehicle terminal device 100 may transmit only passenger information b1 including emergency contact and human information (e.g., name, sex, age, and height) of a passenger among information items included in the passenger information received from the terminal device 200, to the lifesaving center server 32-3.

When the sensing value sensed through the impact sensor is greater than the predetermined second threshold value, the vehicle terminal device 100 may determine the accident level of the accident as a second level.

Upon determining the accident level as a second level, the vehicle terminal device 100 may transmit, to the lifesaving center server 32-3, only passenger information b1+b2 including emergency contact, human information of a passenger, and medical history information of the passenger among the information items included in the passenger information received from the terminal device 200.

Upon detecting that an airbag is operated, the vehicle terminal device 100 may determine the accident level of the accident as a third level.

Upon determining the accident level as the third level, the vehicle terminal device 100 may transmit all of the information items b1+b2+b3 included in the passenger information received from the terminal device 200 to the lifesaving center server 32-3.

As such, the vehicle terminal device 100 may transmit passenger information including different information items for respective accident levels to the lifesaving center server 32-3 and, thus, a person in charge of a lifesaving center may predict an injury state of a passenger based on the passenger information received from the vehicle terminal device 100 of the vehicle 10 that gets into the accident and may perform emergency rescue activity in consideration of the predicted injury state.

Figure 7:
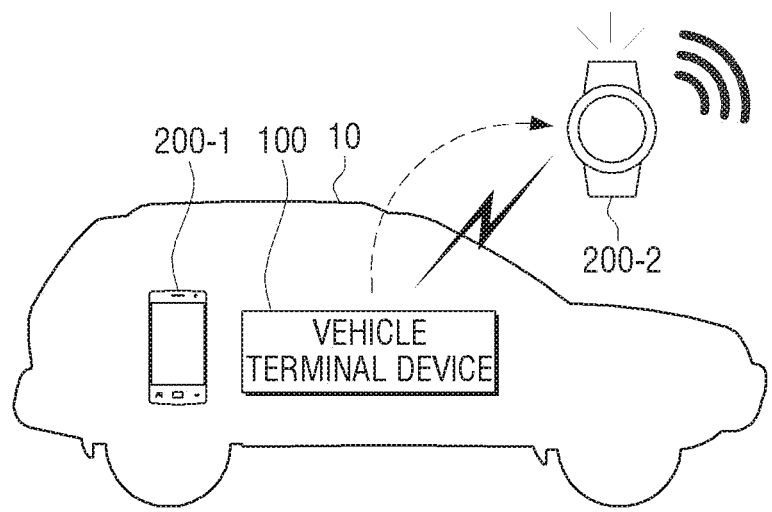
FIG. 7 is a diagram showing an example of recognition of a passenger in a vehicle during an accident by a vehicle terminal device according to an embodiment of the present disclosure.

FIG. 7 is a diagram showing an example of recognition of a passenger in a vehicle during an accident by a vehicle terminal device according to an embodiment of the present disclosure.

Referring to FIG. 7, a driver and a fellow passenger may get in the vehicle 10 and a first terminal device 200-1 of the fellow passenger and a second terminal device 200-2 of the driver may communicate with the vehicle terminal device 100. Upon determining that the accident occurs, the vehicle terminal device 100 may determine whether the passenger in the vehicle 10 departs out of the vehicle 10 through the following embodiment.

According to an embodiment of the present disclosure, the vehicle terminal device 100 may periodically transmit and receive a signal to and from the first and second terminal devices 200-1 and 200-2 that is communicatively connected to the vehicle terminal device 100 to check a communication connection state with the first and second terminal devices 200-1 and 200-2.

Upon determining that an accident occurs, the vehicle terminal device 100 that periodically transmits and receives a signal to and from the first and second terminal devices 200-1 and 200-2 may determine whether the vehicle terminal device 100 is normally communicatively connected to the first and second terminal devices 200-1 and 200-2. As a determination result, upon determining that the vehicle terminal device 100 is communicatively connected to the first terminal device 200-1 among the first and second terminal devices 200-1 and 200-2, the vehicle terminal device 100 may determine that a passenger (driver) related to the second terminal device 200-2 departs from the vehicle 10.

In this case, the vehicle terminal device 100 may make a request for positional information of the second terminal device 200-2 through the second communicator 112 based on pre-stored identification information of the second terminal device 200-2. Accordingly, upon receiving positional information from the second terminal device 200-2 of the passenger (driver) who departs from the vehicle 10, the vehicle terminal device 100 may transmit at least one of passenger information of the first terminal device 200-1 included in the vehicle 10, passenger information including positional information received from the second terminal device 200-2 that departs from the vehicle 10, or state information of the vehicle 10 detected through the detector 120, to the external server 30.

Accordingly, a person in charge of treatment of an accident may rapidly recognize the number of passengers in the vehicle 10 based on the information received from the vehicle terminal device 100 of the vehicle 10 that gets into the accident and, also, may rapidly perform emergency rescue activity of a passenger in the vehicle 10 and emergency rescue activity of a passenger (driver) who departs from the vehicle 10.

According to another embodiment of the present disclosure, the vehicle terminal device 100 may analyze intensity of a signal received from the first and second terminal devices 200-1 and 200-2 that is communicatively connected to the vehicle terminal device 100 to determine whether there is a passenger who departs from the vehicle 10 among passengers in the vehicle 10.

In detail, the vehicle terminal device 100 may periodically transmit and receive a signal to and from the first and second terminal devices 200-1 and 200-2 that are communicatively connected to the vehicle terminal device 100 to check a communication connection state with the first and second terminal devices 200-1 and 200-2.

Upon determining that an accident occurs, the vehicle terminal device 100 that periodically checks the communication connection state with the first and second terminal devices 200-1 and 200-2 may receive a signal from the first and second terminal devices 200-1 and 200-2 that communicatively connected to the vehicle terminal device 100 and may analyze intensity of the received signal.

As the analysis result, when intensity of the signal received from the second terminal device 200-2 among the first and second terminal devices 200-1 and 200-2 is less than predetermine threshold signal intensity, the vehicle terminal device 100 may determine that a passenger (driver) related to the second terminal device 200-2 departs from the vehicle 10.

In this case, the vehicle terminal device 100 may make a request for positional information of the second terminal device 200-2 through the first communicator 111 based on pre-stored identification information of the second terminal device 200-2. Accordingly, upon receiving the positional information from the second terminal device 200-2 of a passenger (driver) who departs from the vehicle 10, the vehicle terminal device 100 may transmit at least one of passenger information of the first terminal device 200-1 included in the vehicle 10, passenger information including the positional information received from the second terminal device 200-2 that departs from the vehicle 10, or state information of the vehicle 10 detected through the detector 120, to the external server 30.

Accordingly, a person in charge of treatment of an accident may rapidly recognize the number of passengers in the vehicle 10 based on the information received from the vehicle terminal device 100 of the vehicle 10 that gets into the accident and, also, may rapidly perform emergency rescue activity of a passenger in the vehicle 10 and emergency rescue activity of a passenger (driver) who departs from the vehicle 10.

Thus far, the components of the vehicle terminal device 100 according to the present disclosure have been described in detail. Hereinafter, a control method of the vehicle terminal device 100 according to the present disclosure will be described in detail.

Figure 8:
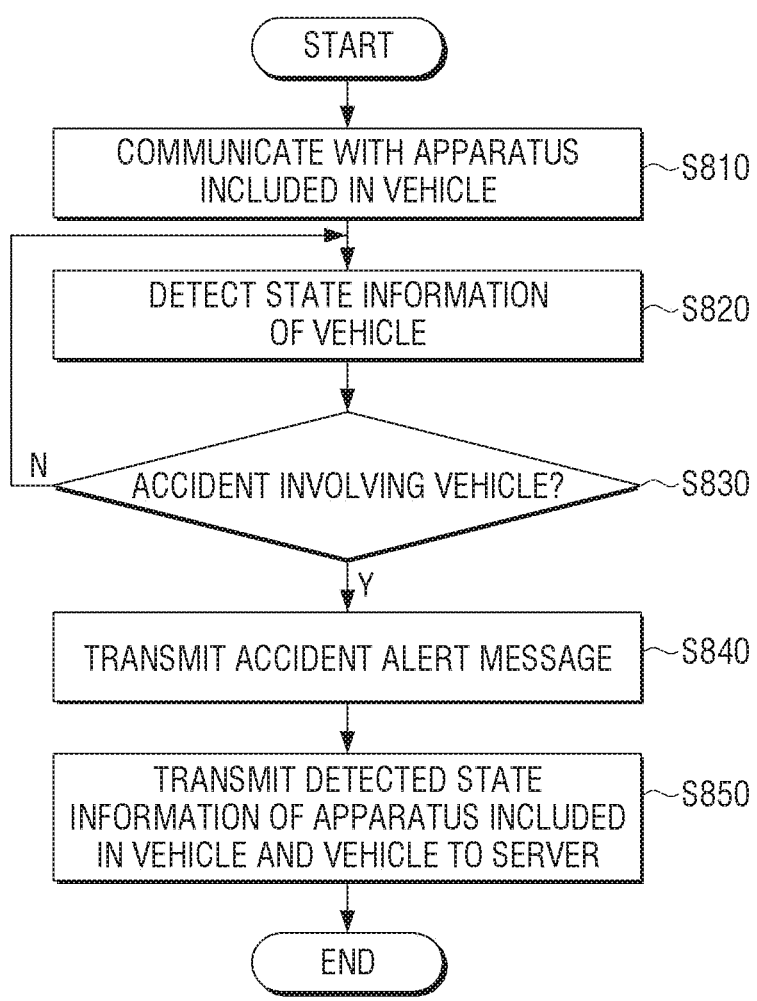
FIG. 8 is a flowchart of a control method of a vehicle terminal device according to an embodiment of the present disclosure.

FIG. 8 is a flowchart of a control method of a vehicle terminal device according to an embodiment of the present disclosure.

Referring to FIG. 8, when power is supplied to the vehicle 10, the vehicle terminal device 100 installed in the vehicle 10 may communicate with an apparatus included in the vehicle 10 using a first wireless communication at operation S810.

Here, the apparatus included in the vehicle 10 may include at least one of the driving record device 400 or the terminal device 200 of a driver and a fellow passenger (hereinafter referred to as passenger) in the vehicle 10. The driving record device 400 may collect travel information of the traveling vehicle 10 and may be, for example, a black box. The terminal device 200 of the passenger may be a display device such as a smartphone or a wearable device such as a smartwatch.

The first wireless communication may be a communication method that performs communication through a short distance module such as a BT module, an IrDA module, an NFC module, a WiFi module, and a Zigbee module.

Upon beginning communication with the terminal device 200 of the passenger and the driving record device 400 using the first wireless communication, the vehicle terminal device 100 may detect state information of the vehicle 10 through the aforementioned configuration of the detector 120 at operation S820. Here, the state information of the vehicle 10 may include at least one of speed information, vehicular indoor temperature, and air quality information of the vehicle 10, distance information from an adjacent vehicle, captured image information of a passenger in the vehicle 10, airbag operation detection information, or a tire inflation pressure information.

Upon detecting the state information of the vehicle 10, the vehicle terminal device 100 may determine whether there is an accident involving the vehicle based on the detected state information of the vehicle 10 at operation S830.

According to an embodiment of the present disclosure, the vehicle terminal device 100 may predict that the accident will occur upon detecting that the detected driving speed of the vehicle 10 is reduced below first threshold speed or is suddenly increased to a second threshold speed or more within a predetermined threshold time.

According to another embodiment of the present disclosure, the vehicle terminal device 100 may predict that the accident will occur upon detecting that a distance from the adjacent vehicle 20 is less than a predetermined threshold distance based on the traveling vehicle 10.

According to another embodiment of the present disclosure, the vehicle terminal device 100 may predict that accident will occur upon detecting that the detected temperature inside the vehicle 10 is equal to or greater than a predetermined temperature value or concentration of $CO_2$ in the vehicle 10 is equal to or greater than a predetermined threshold concentration value.

According to another embodiment of the present disclosure, the vehicle terminal device 100 may predict that the accident will occur upon detecting an event in which an airbag installed in the vehicle 10 is operated, an event in which a tire inflation pressure is less than a threshold value, or an event in which a vehicle departs from a current lane.

According to another embodiment of the present disclosure, the vehicle terminal device 100 may predict that the accident will occur upon detecting that a sensing value of detected impact intensity is equal to or greater than a predetermined threshold value.

According to various embodiments of the present disclosure, upon predicting whether the accident occurs, the vehicle terminal device 100 may combine the prediction results about accident occurrence to lastly determine whether the accident occurs.

Upon determining that an accident occurs, the vehicle terminal device 100 may broadcast an accident alert message for alerting that the accident occurs, to at least one of the apparatuses included in the adjacent vehicle 20 or the traffic management device 300 at operation S840.

Then, the vehicle terminal device 100 may transmit at least one of information received from the apparatus included in the vehicle 10 or state information of the vehicle 10 detected in the vehicle terminal device 100, to the external server 30 at operation S850.

Here, the apparatus included in the adjacent vehicle 20 may be the vehicle terminal device 100 of the adjacent vehicle 20. Accordingly, the vehicle terminal device 100 of the adjacent vehicle 20 that travels in a section including a corresponding accident point at a time point in which an accident occurs among the plurality of adjacent vehicles 20 may receive the accident alert message that is broadcast from the vehicle terminal device 100 of the vehicle 10 that gets into the accident.

The traffic management device 300 may be installed on a road to monitor a road traffic situation, may manage road traffic such as control of vehicle traveling, and may include, for example, a traveling display device, a speeding detection device, and an image capturing device for monitoring a road state. The at least one traffic management device 300 installed in a section including a point in which an accident among the plurality of traffic management devices 300 may receive the accident alert message that is broadcast from the vehicle terminal device 100 of the vehicle 10 that gets into the accident.

Here, the accident alert message may be used to transmit traffic information including at least one of traffic signal information, vehicle speed information, time information, or image information acquired in a section including a point in which an accident occurs, to the external server 30 from at least one of the vehicle terminal device 100 of the adjacent vehicle 20 or the traffic management device 300.

In this case, upon receiving the accident alert message, at least one of the vehicle terminal device 100 of the adjacent vehicle 20 or the traffic management device 300 may transmit traffic information collected from at least one of the vehicle terminal device 100 or the traffic management device 300, to the external server 30.

In detail, upon receiving the accident alert message, the vehicle terminal device 100 of the adjacent vehicle 20 may receive the travel information collected from the driving record device 400 included in the adjacent vehicle 20 and the passenger information collected from the terminal device 200 of a passenger in the adjacent vehicle 20. Then, the vehicle terminal device 100 of the adjacent vehicle 20 may acquire traffic information related to a point in which an accident occurs from the information received from the driving record device 400 and the terminal device 200 based on information (positional information and time information) included in the accident alert message. Then, the vehicle terminal device 100 of the adjacent vehicle 20 may transmit the pre-acquired traffic information related to the point in which the accident occurs, to the external server 30.

Upon receiving the accident alert message, the traffic management device 300 may acquire traffic information including at least one of traffic signal information, image information, or vehicle speed information recorded around a time point in which the accident occurs, based on information (positional information and time information) included in the received accident alert message and may transmit the acquired traffic information to the external server 30.

As described above, the vehicle terminal device 100 of the adjacent vehicle 20 and the traffic management device 300 that acquire the traffic information based on the accident alert message received from the vehicle terminal device 100 of the vehicle 10 that gets into the accident may transmit the pre-acquired traffic information to the vehicle terminal device 100 that transmits the accident alert message.

In this case, the vehicle terminal device 100 may transmit traffic information received from at least one of the vehicle terminal device 100 of the adjacent vehicle 20 or the traffic management device 300, to the external server 30.

Upon determining that a carrier accident occurs, the vehicle terminal device 100 of the vehicle 10 may receive passenger information from the terminal device 200 that is communicatively connected to the vehicle terminal device 100 using a first wireless communication and may receive travel information from the driving record device 400.

Here, the passenger information may include passenger human information such as a passenger name, age, sex, address, body information, and emergency contact and passenger biometric information such as a passenger heart rate and pulse rate. In addition, the passenger information may further include terminal information on the terminal device 200. Here, the terminal information may further include identification information, positional information, and speed information of the terminal device 200 and control information for controlling an operation of the terminal device 200. For example, the control information may be a control signal for emergency call for an organization for treatment of an accident when the accident occurs.

The travel information may include at least one of vehicle speed information, time information, or image information obtained according to event that occurs when the vehicle 10 travels or stops.

Upon receiving the passenger information and the travel information, the vehicle terminal device 100 may transmit at least one of the received passenger information and travel information, or state information of the vehicle 10 detected in the vehicle terminal device 100, to the external server 30.

Here, the external server 30 may include a first server 31 (e.g., a cloud server) for storing traffic accident related information and a second server 32 (e.g., an organization server) that is in charge of treating a traffic accident.

Accordingly, when an accident occurs, the vehicle terminal device 100 may transmit the passenger information received from the terminal device 200, the travel information received from the driving record device 400, and the state information of the vehicle 10 detected in the vehicle terminal device 100, to the first server 31 using a second wireless communication.

The vehicle terminal device 100 may some of the passenger information received from the terminal device 200, the travel information received from the driving record device 400, and the state information of the vehicle 10 detected in the vehicle terminal device 100, to the second server 32 using the second wireless communication method.

Here, the second wireless communication method may be a communication method that performs communication through a mobile communication module that accesses a mobile communication network and performs communication according to various mobile communication standards such as 3G, 3GPP, and LTE. In addition, the second server 32 may include an insurer server, a police station server, a lifesaving center server, and the like.

In some embodiments, the vehicle terminal device 100 may transmit the passenger information and the travel information to the insurer server, may transmit the state information and travel information of the vehicle 10 to the police station server, and may transmit the passenger information of a passenger in the vehicle 10, to the lifesaving center server.

According to an additional aspect of the present disclosure, upon determining that an accident occurs, the vehicle terminal device 100 may determine an accident level based on the state information of the vehicle 10 and may transmit all or some of the information items received from the apparatus included in the vehicle 10 to the external server 30 through a second wireless communication module based on the determined accident level.

In detail, the vehicle terminal device 100 may transmit, to the external server 30, passenger information including emergency contact and human information among the passenger information received from the terminal device 200 of a passenger in the vehicle 10 when the accident level is a first level. The vehicle terminal device 100 may transmit, to the external server 30, a passenger level including emergency contact, blood information, and medical history information among the passenger information received from the terminal device 200 of a passenger in the vehicle 10 when the accident level is a second level. In addition, the vehicle terminal device 100 may transmit, to the external server 30, all information items received from the terminal device 200 of a passenger in the vehicle 10 when the accident level is a third level.

According to an additional aspect of the present disclosure, upon determining that an accident occurs, the vehicle terminal device 100 may transmit, to the terminal device 200, a control signal for performing an emergency call service operation based on the passenger information received from the terminal device 200 of a passenger in the vehicle 10.

Accordingly, the terminal device 200 may execute an emergency call service related program to perform call related to emergency situation occurrence on the external server 30 based on the control signal received from the vehicle terminal device 100.

The aforementioned control method of the vehicle terminal device 100 may be embodied as at least one execution program and the execution program may be stored in a non-transitory computer readable medium.

The non-transitory computer readable medium is a medium that semi-permanently stores data and from which data is readable by a device, but not a medium that stores data for a short time, such as register, a cache, a memory, and the like. In detail, the aforementioned programs may be stored in various types of terminal-readable recording media, for example, a RAM, a flash memory, a ROM, erasable programmable ROM (EPROM), electronically erasable and programmable ROM (EEPROM), register, a hard disk, a removable disk, a memory card, a USB memory, and a CD-ROM.

While the present disclosure has been shown and described with reference to various embodiments thereof, it will be apparent to those skilled in the art that various changes in form and details may be made therein without departing from the spirit and scope of the present disclosure as defined by the appended claims and their equivalents.

What is claimed is:

1. A vehicle terminal device installed in a vehicle, the vehicle terminal device comprising:
   a first communicator configured to communicate with a first apparatus included in the vehicle using a first wireless communication;
   a second communicator configured to communicate with a second apparatus outside the vehicle using a second wireless communication;
   a detector configured to detect state information of the vehicle; and
   a controller configured to:
      control the second communicator to broadcast an accident alert message for alerting of an accident involving the vehicle to at least one of a third apparatus included in an adjacent vehicle or a traffic management device in response to a determination of the accident based on the state information of the vehicle detected through the detector,
      determine an accident level based on the state information, and
      control the second communicator to transmit at least one of information received from the first apparatus included in the vehicle through the first communicator or the state information of the vehicle detected through the detector, based on the determined accident level, to an external server,
   wherein the transmitted information is different according to the determined accident level, and
   wherein the controller controls the second communicator to transmit, to the external server, passenger information comprising:
      an emergency contact and a human information among the received at least one of information when the accident level is a first level, and
      the emergency contact, a blood information, and a medical history information among the received information when the accident level is a second level, and
      all the received information when the accident level is a third level.

2. The vehicle terminal device as claimed in claim 1, wherein the accident alert message comprises at least one of positional information of the vehicle, time information on a time point of detecting the accident, or identification information of the vehicle terminal device.

3. The vehicle terminal device as claimed in claim 1, wherein the accident alert message is a message for transmitting traffic information comprising at least one of traffic signal information, vehicle speed information, time information, or image information captured that corresponds to at least one of a time or location of the accident, to the external server from at least one of the third apparatus included in the adjacent vehicle or the traffic management device.

4. The vehicle terminal device as claimed in claim 1,
   wherein the accident alert message is a message for transmitting traffic information comprising at least one of traffic signal information, vehicle speed information, time information, or image information captured that corresponds to at least one of a time or location of the accident, to the vehicle terminal device from at least one of the adjacent vehicle or the traffic management device, and
   wherein, in response to the traffic information being received, the controller controls the second communicator to transmit the received traffic information to the external server.

5. The vehicle terminal device as claimed in claim 1,
   wherein the first communicator communicates with at least one of a driving record device included in the vehicle or a terminal device of a passenger in the vehicle, and
   wherein information received from the first apparatus included in the vehicle comprises at least one of travel information collected from the driving record device or passenger information received from the terminal device.

6. The vehicle terminal device as claimed in claim 1, wherein the state information of the vehicle comprises at least one of speed information, vehicular indoor temperature, air quality information of the vehicle, distance information from the adjacent vehicle, captured image information of a passenger, airbag operation detection information, or a tire inflation pressure information.

7. The vehicle terminal device as claimed in claim 1, wherein the controller controls the second communicator to:
   transmit information received from the first apparatus included in the vehicle and the state information of the vehicle detected through the detector, to a first server, and
   transmit only some of information received from the first apparatus included in the vehicle and the state information of the vehicle detected through the detector, to a second server.

8. The vehicle terminal device as claimed in claim 1, wherein the controller controls the first communicator to transmit a control signal for performing an emergency call service operation to a terminal device of a passenger in the vehicle in response to the determined accident.

9. A control method of a vehicle terminal device installed in a vehicle, the method comprising:
- detecting state information of the vehicle;
- determining whether there is an accident involving the vehicle based on the state information of the vehicle;
- broadcasting an accident alert message for alerting of the accident to at least one of a first apparatus included in an adjacent vehicle or a traffic management device in response to a determination of the accident based on the state information of the vehicle detected through a detector;
- determining an accident level based on the state information; and
- transmitting at least one of information received from a second apparatus included in the vehicle and the detected state information of the vehicle, based on the determined accident level, to an external server,
- wherein the transmitted information is different according to the determined accident level, and
- wherein the controller controls a communicator to:
  - transmit, to the external server, an emergency contact and a human information among the received at least one of information when the accident level is a first level, and
  - transmit, to the external server, the emergency contact, a blood information, and a medical history information among the received information when the accident level is a second level, and
  - transmit, to the external server, all the received information when the accident level is a third level.

10. The method as claimed in claim 9, wherein the accident alert message comprises at least one of positional information of the vehicle, time information on a time point of detecting the accident, or identification information of the vehicle terminal device.

11. The method as claimed in claim 9, wherein the accident alert message is a message for transmitting traffic information comprising at least one of traffic signal information, vehicle speed information, time information, or image information captured that corresponds to at least one of a time or location of the accident, to the external server from at least one of the first apparatus included in the adjacent vehicle or the traffic management device.

12. The method as claimed in claim 9,
- wherein the accident alert message is a message for transmitting traffic information comprising at least one of traffic signal information, vehicle speed information, time information, or image information captured that corresponds to at least one of a time or location of the accident, to the vehicle terminal device from at least one of the adjacent vehicle or the traffic management device, and
- wherein, the transmitting to the external server comprises, in response to the traffic information being received, transmitting the received traffic information to the external server.

13. The method as claimed in claim 9, further comprising communicating with at least one of a driving record device included in the vehicle or a terminal device of a passenger in the vehicle,
- wherein information received from the second apparatus included in the vehicle comprises at least one of travel information collected from the driving record device or passenger information received from the terminal device.

14. The method as claimed in claim 9, wherein the state information of the vehicle comprises at least one of speed information, vehicular indoor temperature, air quality information of the vehicle, distance information from the adjacent vehicle, captured image information of a passenger, airbag operation detection information, or a tire inflation pressure information.

15. The method as claimed in claim 9, wherein the transmitting to the external server comprises:
- transmitting information received from the second apparatus included in the vehicle and the state information of the vehicle, to a first server; and
- transmitting only some of information received from the second apparatus included in the vehicle and the state information of the vehicle, to a second server.

16. The method as claimed in claim 9, further comprising:
- transmitting a control signal for performing an emergency call service operation to a terminal device of a passenger in the vehicle in response to the determined accident.

* * * * *